(12) United States Patent
Buch

(10) Patent No.: US 9,105,289 B1
(45) Date of Patent: Aug. 11, 2015

(54) INTEGRATED SERVO FIELD FOR MEMORY DEVICE

(71) Applicant: Seagate Technology LLC, Cupertino, CA (US)

(72) Inventor: Bruce Douglas Buch, Westborough, MA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/515,220

(22) Filed: Oct. 15, 2014

(51) Int. Cl.
| | | |
|---|---|---|
| G11B 5/02 | (2006.01) | |
| G11B 5/596 | (2006.01) | |
| G11B 5/55 | (2006.01) | |

(52) U.S. Cl.
CPC .......... *G11B 5/5539* (2013.01); *G11B 5/59616* (2013.01)

(58) Field of Classification Search
None
See application file for complete search history.

(56) References Cited

U.S. PATENT DOCUMENTS

| | | | |
|---|---|---|---|
| 5,384,671 A | | 1/1995 | Fisher |
| 5,966,264 A * | | 10/1999 | Belser et al. ............... 360/77.08 |
| 6,510,015 B2 | | 1/2003 | Sacks et al. |
| 6,515,812 B1 | | 2/2003 | Bergmans et al. |
| 6,643,082 B1 | | 11/2003 | Belser |
| 6,819,514 B1 * | | 11/2004 | Behrens et al. ............... 360/65 |
| 7,164,548 B2 | | 1/2007 | Hattori et al. |
| 7,508,611 B2 | | 3/2009 | Buch et al. |
| 7,848,039 B2 | | 12/2010 | Moser et al. |
| 7,885,026 B2 | | 2/2011 | Lee et al. |
| 8,035,908 B2 | | 10/2011 | Park et al. |
| 8,154,813 B2 | | 4/2012 | Weller et al. |
| 2002/0150179 A1 | | 10/2002 | Leis et al. |
| 2003/0169525 A1 * | | 9/2003 | Ogawa et al. ............... 360/29 |
| 2007/0242377 A1 * | | 10/2007 | Hiura et al. ............... 360/39 |
| 2007/0258161 A1 | | 11/2007 | Richter et al. |
| 2008/0285399 A1 * | | 11/2008 | Kobayashi ............... 369/44.32 |
| 2012/0044597 A1 | | 2/2012 | Yoshida |
| 2013/0319850 A1 | | 12/2013 | Hirano et al. |

OTHER PUBLICATIONS

U.S. Appl. No. 14/175,951, filed Feb. 7, 2014, Steiner.

* cited by examiner

*Primary Examiner* — Peter Vincent Agustin
(74) *Attorney, Agent, or Firm* — Hollingsworth Davis, LLC

(57) ABSTRACT

A pattern of features of a storage medium includes first features having a first logical state and second features having a second logical state, wherein a cross track dimension of the first features is different from a cross track dimension of the second features. A transducer of a memory device senses the pattern of features and generates a transducer signal. Read circuitry samples the transducer signal at a frequency of a sampling clock signal and generates a read signal from the sampled transducer signal. Servo electronics includes a demodulator that demodulates at least first and second orthogonal frequency components of the read signal. Timing circuitry synchronizes a phase of the sampling clock signal with a phase of the pattern of features using the first orthogonal frequency component. Position error circuitry generates a signal indicating a cross track positional offset of the transducer relative to the features using the first and second orthogonal frequency components.

19 Claims, 12 Drawing Sheets

INTEGRATED SERVO FIELD FOR MEMORY DEVICE

TECHNICAL FIELD

This application relates generally to memory devices as well as systems that incorporate such memory devices, and methods pertaining to such memory devices.

SUMMARY

A transducer of a memory device senses a pattern of features of a storage medium and generates a transducer signal. The pattern of features includes first features having a first logical state and second features having a second logical state. A cross track dimension of the first features is different from a cross track dimension of the second features. Read circuitry samples the transducer signal at a frequency of a sampling clock signal and generates a read signal from the sampled transducer signal. Servo electronics includes a demodulator that demodulates at least first and second orthogonal frequency components of the read signal. Timing circuitry synchronizes a phase of the sampling clock signal with a phase of the pattern of features using the first orthogonal frequency component. Position error circuitry generates a signal indicating a cross track position offset of the transducer relative to the features using the first and second orthogonal frequency components.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Some embodiments described herein involve a data storage device capable of obtaining servo timing and position error signal information from the spectral content of an integrated servo field of the recording medium. Servo timing information is used to establish correct phase lock between the data pattern on recording medium relative to the sampling clock used to sample the data. The position error signal (PES) information provides the cross track positional error of the data transducer relative to a track of the recording medium. According to embodiments discussed herein, the timing and PES information can be obtained by demodulating the signal read from the integrated servo field into orthogonal frequency components. A first orthogonal component is used to provide the timing information and the second orthogonal component is used along with the first orthogonal component to provide the PES.

The servo patterns of the integrated servo field include at least first features and second features, wherein the first features correspond to a first logical state and the second features correspond to a second logical state. The second features differ in dimension along the cross track direction. Where the storage medium is magnetic and includes magnetic features, the difference in the cross track dimension provides for differential properties enabling one of the first magnetic features or the second magnetic features to be selectively magnetized over the other one.

The difference in cross track dimension of the first and second features facilitates retrieving both timing and positional error signal information from the integrated servo field. Although not limited to magnetic storage, approaches discussed herein are applicable to one or both of continuous and patterned magnetic recording media including longitudinal magnetic recording media ("LMR"), perpendicular magnetic recording media ("PMR"), heat-assisted magnetic recording media ("HAMR"), discrete track recording media ("DTR"), and bit-patterned media ("BPM").

Figure 1:
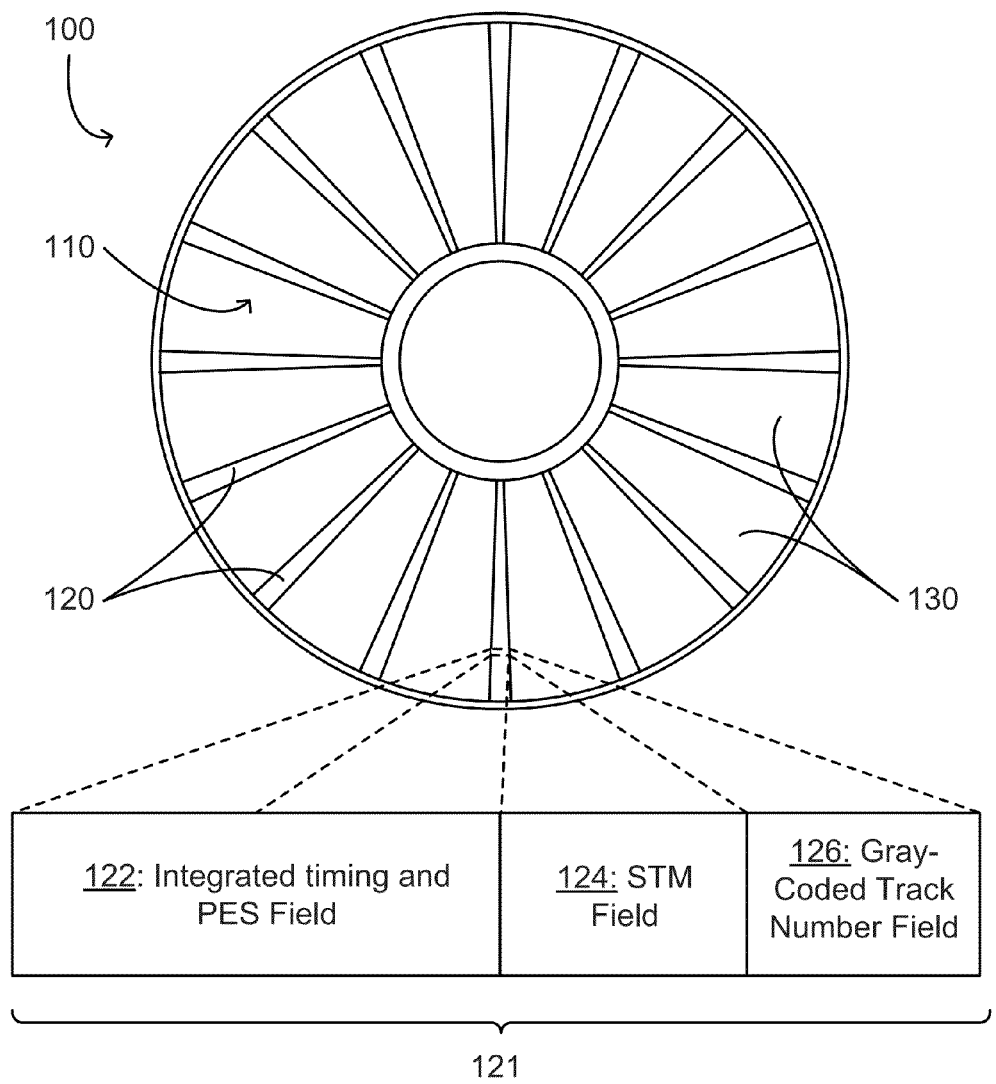
FIG. 1 provides a non-limiting example of a recording medium that includes an integrated servo field.

FIG. 1 provides a non-limiting example of a recording medium 100 that includes a servo pattern that includes an integrated servo field. It should be understood that the recording medium 100 illustrated in FIG. 1 is a simplified illustration or schematic provided to aid understanding of the recording media including servo patterns patterned therein. As such, the recording medium 100 of FIG. 1 is illustrated without certain features such as tracks, zones for zoned bit recording, etc. The servo patterns patterned into the recording media may be part of any servo scheme for recording media, including, but not limited to, a wedge servo scheme, an embedded servo scheme, and a dedicated servo scheme.

In some embodiments, for example, the servo patterns patterned into the recording media may be part of an embedded servo scheme. FIG. 1 provides an example of an embedded servo scheme 110 for the recording medium 100 according to some embodiments. The servo patterns patterned into the recording media may be part of any one or more servo areas or servo sectors in a servo scheme, including all servo sectors of a servo scheme. FIG. 1 provides an example of the patterned recording medium 100 including the embedded servo scheme 110, which includes servo sectors 120 alternately arranged with data areas or data sectors 130. As further provided in FIG. 1, such servo sectors may include, but are not limited to, a cluster of servo sector fields 121 from which the timing, gain control and cross track positional offset, and track number can be determined. The cluster of servo sector fields shown in FIG. 1 includes an integrated timing and position error signal (PES) field 122, a servo timing mark ("STM") field 124, and a Gray-coded track number field 126. The integrated field 122 includes a pattern from which both timing acquisition and cross track position error information for servo control can be obtained.

Because the recording medium 100 illustrated in FIG. 1 is a simplified illustration or schematic without certain features such as tracks, it should be understood that the cluster of servo sector fields illustrated in FIG. 1 represents a cluster of servo sector fields in a single track traversing a single servo sector. The servo patterns patterned into the recording media may be part or all of any one or more of the servo sector fields or their equivalents in any one or more tracks of any one or more servo sectors, including all of the foregoing servo sector fields or their equivalents in all tracks of all servo sectors.

The servo patterns of the recording media include at least first features having a first dimension in the cross track direction and second features which have a second dimension in the cross track direction, wherein the first dimension is different from the second dimension. In some embodiments, the down track dimension of the first and second features may be the same or about the same. In some embodiments, the cross track dimension of one of the first or second features is the same or about the same as features present in one, more than one, or all data sectors. The first features can have a first logical state and the second features can have a second logical state. For example, wherein magnetic features are used, the first features may have a first magnetization orientation and the second features may have a second magnetization orientation different from the first magnetization orientation.

In some embodiments, the first and second features may be magnetic features of a magnetic storage medium. In these embodiments, the dimensional difference between the first magnetic features and the second magnetic features enable one of the first magnetic features or the second magnetic features to be selectively magnetized over the other one. One population of magnetic features may be selectively magnetized over another population of magnetic features due to size-based coercivity. In some embodiments, for example, the first population of magnetic features may have a first coercivity and the second population of magnetic features may have a second coercivity, wherein the first coercivity is greater than the second coercivity or the second coercivity is less than the first coercivity, for example, as measured in Oersteds ("Oe") or amperes per meters (A/m). In such embodiments, both the first population of magnetic features and the second population of magnetic features may be magnetized with an external magnetic field having a strength sufficient to orient the magnetic moments corresponding to the magnetic features of both the first population and the second population in a first direction (e.g., positive). Further in such embodiments, the second population of magnetic features may be magnetized with an external magnetic field having a strength insufficient to reorient the magnetic moments corresponding to the magnetic features of the first population in a second direction (e.g., negative) but sufficient to reorient the magnetic moments corresponding to the magnetic features of the second population in the second direction (e.g., negative), wherein the first direction (e.g., positive) and the second direction (e.g., negative) are opposite directions. In other embodiments, the servo pattern may be designed such that the magnetic moments corresponding to the magnetic features of the second population may reorient in the second direction (e.g., negative) using thermal energy. Further in such other embodiments, the magnetic moments corresponding to the magnetic features of the second population may spontaneously reorient under normal operating conditions (e.g., standard ambient temperature and pressure ["SATP"]) using ambiently available thermal energy or reorient using applied thermal energy. Without specific regard to the means, orientation of the magnetic moments corresponding to the first magnetic features in a first direction (e.g., positive) and orientation of the magnetic moments corresponding to the second magnetic features in a second direction (e.g., negative) may induce a lower energy state and/or more stable state for any one or more magnetic features of the first population or the second population; a lower energy state and/or more stable state for any one or more combinations of magnetic features of the first population and the second population; and/or a lower energy state and/or more stable state for any one or more servo patterns, which servo patterns may be part or all of any one or more servo sector fields or their equivalents in any one or more tracks of any one or more servo sectors, including all servo sector fields or their equivalents in all tracks of all servo sectors.

Figure 2:
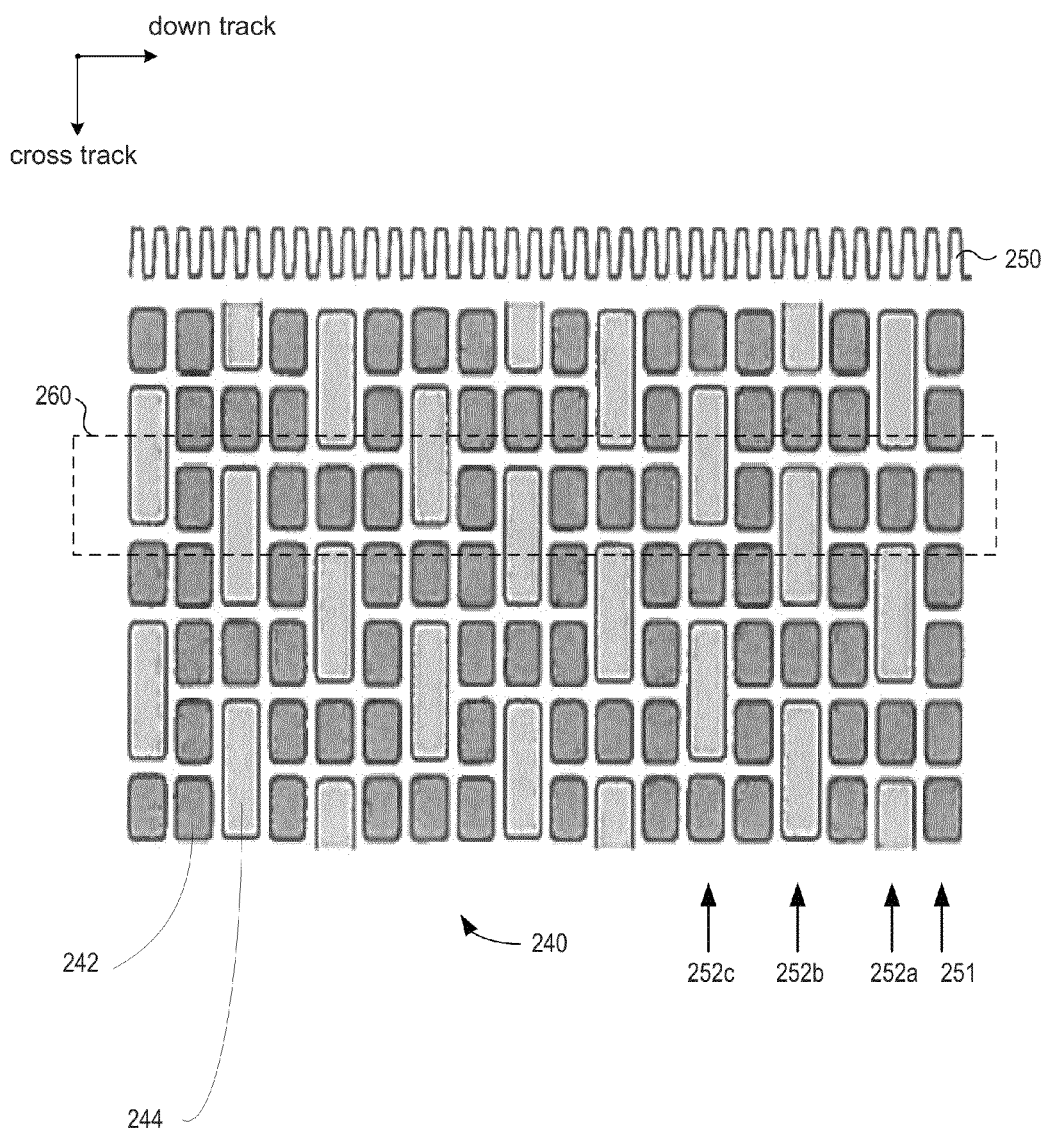
FIG. 2 is a top view of an example servo pattern or a portion thereof.

The first and second features in the integrated timing and PES field may be of the same general shape differing in the cross track dimension. For example, the first and second features may be cuboids differing in a cross track dimension as illustrated in FIG. 2. FIG. 2 provides a top view of an example of a portion of an integrated timing and PES field of a servo pattern 240. The first features 242 are illustrated as black rectangles and may be the same or about the same size and shape as the features in the data sectors. The second features 244 are illustrated as gray rectangles and are shown as being larger in the cross track direction when compared to the first features 242, e.g., the cross track dimension of the second features may be about twice that of the first features. Although the first and second features are represented in FIG. 2 as having a generally rectangular shape, the first and second features may have other shapes, for example, generally oval or elliptical.

In embodiments wherein the storage medium is a magnetic medium and the first and second features are magnetic features, because the second magnetic features 244 have twice the surface area (as shown) and/or volume of the first magnetic features 242, the coercivity of the second magnetic features 244 may be less than that for the first magnetic features 242. Thus, the switching field for the second magnetic features 244 may also be described as lower than that for the first magnetic features 242. The first and/or second magnetic features may be millimeter-sized (e.g., units of mm as measured), micrometer-sized (e.g., units of μm as measured), or nanometer-sized (e.g., units of nm as measured) in a minor dimension, contributing to the stability of the magnetic features, which magnetic features may each be or include a single magnetic domain. The single magnetic domain may be stable to reversal and/or to splitting into smaller magnetic domains, for example, under normal operating conditions (e.g., SATP) for any of the patterned recording media for digital data storage devices provided herein. In some embodiments, for example, the first and/or second magnetic features may be nanometer-sized, such as at least 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, or 20 nm in a minor dimension. The foregoing is not intended to be limiting as the magnetic features be sized as appropriate for any of the recording media for digital data storage devices provided herein.

In FIG. 2, the logical bit period corresponds to a single column of features 242, 244 and the pattern of features is oversampled with a sampling clock having a frequency twice that of the feature frequency as illustrated by the sampling clock signal trace 250 above the servo pattern 240 in FIG. 2. The columns of the pattern 240 alternate between columns 251 having the first features 242 (the smaller features in this example) and columns 252a, 252b, 252c having both first 242 and second 244 features. In the illustrated example, the columns 252a, 252b, 252c having a mix of both first 242 and second 244 features are staggered in the cross track direction. The servo field 240 shown in FIG. 2 can serve as both a timing (preamble) field for timing acquisition as well as a PES field for determining cross track position. The servo pattern 240 shown in FIG. 2 provides stability for magnetic features because softer coercivity second features 244 are surrounded by opposite polarity harder coercivity first features 242.

Figure 3:
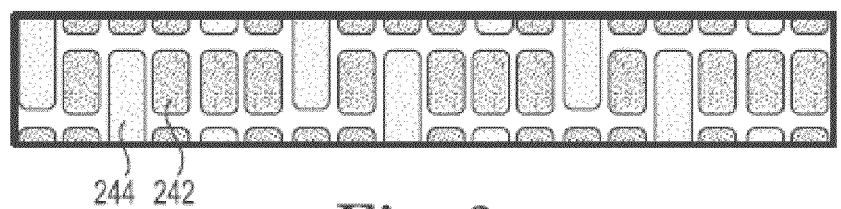
FIG. 3 shows the pattern of FIG. 2 as seen by a data transducer having a width in the cross track direction of about twice the cross track width of the first features.

FIG. 3 shows the pattern of the servo field shown in FIG. 2 as seen by a data transducer having a width in the cross track direction of about twice the cross track width of the first features 242 as the data transducer traverses the storage medium along the track position illustrated by the dashed box 260. For purposes of illustration, the state, e.g., magnetization orientation, of the first features corresponds to a logical 0 and the state of the second features corresponds to a logical 1 in this example, although the reverse scenario is also possible. The transducer signal reflects the repeating six feature sequence corresponding to logical states 101000.

Figure 4:
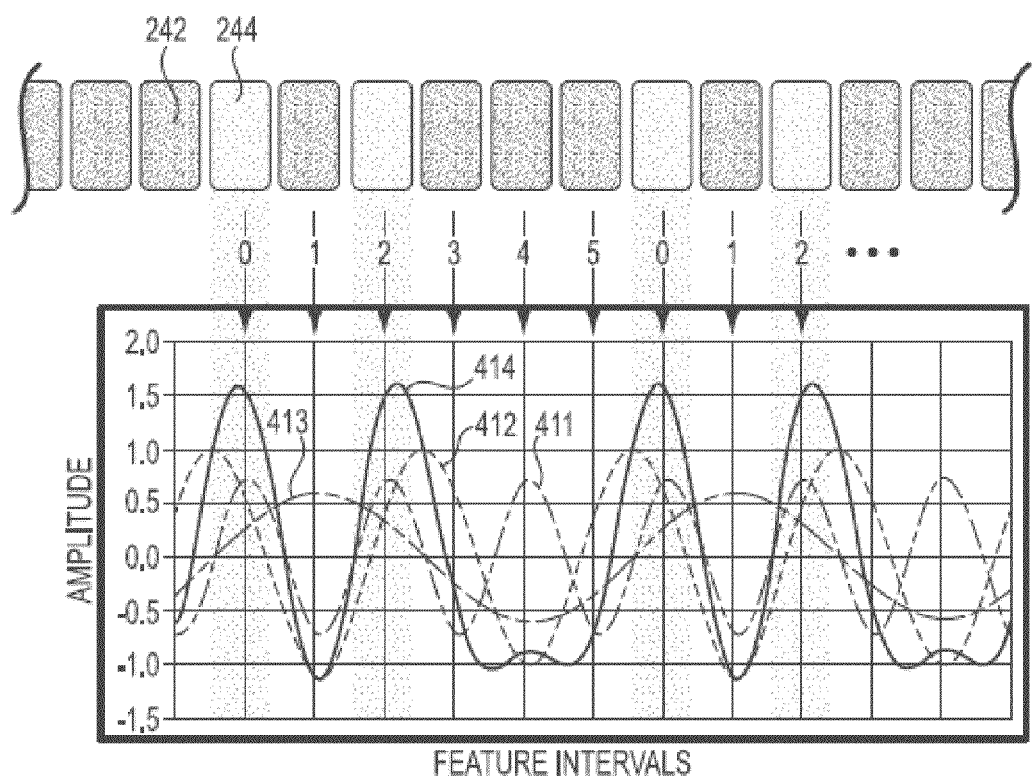
FIG. 4 shows the read signal generated by the servo pattern of FIG. 3 corresponding to a waveform which is the sum of sinusoids having periods of 2T, 3T, and 6T, wherein T is the period of a single feature.

The read signal generated by the servo pattern of FIG. 3 corresponds to a waveform which is the sum of sinusoids having periods of 2T, 3T, and 6T, wherein T is the period of a single feature. The frequency composition of the read signal is illustrated in FIG. 4. Traces 411-413 shown in FIG. 4 are sinusoids having frequencies of 1/(2T), 1/(3T), and 1/(6T), respectively. Trace 414 is the sum of these orthogonal component signals and corresponds to the repeating six feature sequence of the servo pattern. At any cross track position, the pattern of FIG. 4 consists of first features alternating with second features with the occasional missing cycle.

Oversampling at twice the feature frequency enables discrete Fourier transform demodulation (DFT) of orthogonal frequency components of the read signal from which the timing and PES information can be extracted. The phase of the 1/(2T) component varies with the phase of the sampling clock relative to the phase of the features and is independent of cross track position. The phase of the 1/(2T) component provides the timing information and can be used to align the phase of the sampling clock with the phase of the features. The phase of the 1/(3T) component provides an indication of the cross track offset of the data transducer when normalized to the phase of the 1/(2T) component.

Figure 5:
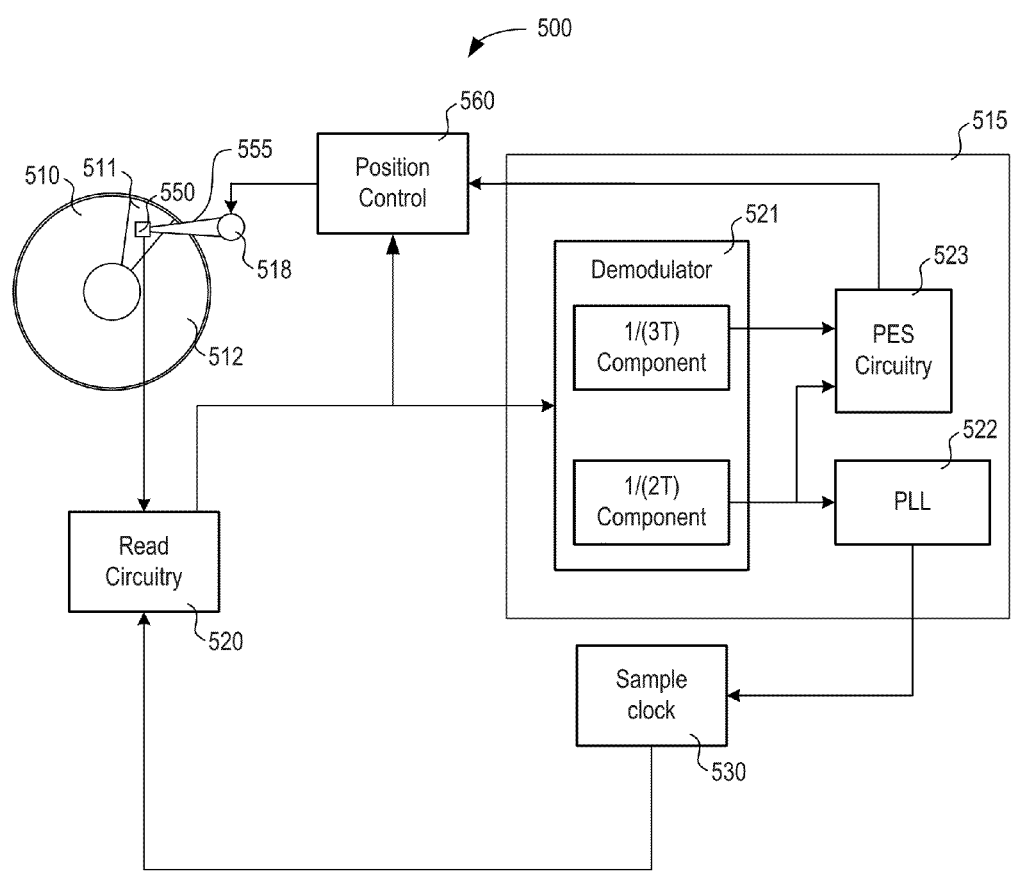
FIG. 5 is a block diagram of a system configured to extract and use timing and cross track position error information from an integrated servo field of a storage medium.

FIG. 5 is a block diagram of a system 500 configured to extract and use timing and PES information from an integrated servo field of a storage medium. The system includes a storage medium 510 having servo sectors 511 and data sectors 512, the servo sectors 511 including an integrated timing and PES field as previously discussed. The system 500 includes at least one transducer 550 configured to generate a transducer signal in response to sensing the features on the storage medium including a pattern of features of the servo field 511. The transducer 550 is disposed on an actuator arm 555 that pivots about a pivot bearing. Movement of the actuator arm 555 may be provided by an actuator arm drive assembly, such as a voice coil motor 518 or the like. The voice coil motor (VCM) 518 controls the movement of the actuator arm 555 under the control of position control electronics 560.

The system 500 includes read circuitry 520 that receives and processes the transducer signal and passes the processed read signal to a servo circuitry 515. The servo circuitry 515 includes a demodulator 521 that demodulates the read signal into orthogonal frequency components such as a 1/(2T) component and a 1/(3T) component. For example, the demodulator 521 may implement a discrete Fourier transform (DFT) to demodulate the read signal. The system includes a sample clock 530 that provides a sample clock signal that is phase locked to the phase of the 1/(2T) frequency component by timing circuitry 522, e.g., phase lock loop (PLL). The PES circuitry 523 provides a PES from the phase of the 1/(3T) component normalized to the phase of the 1/(2T) component. The position control electronics 560 uses the PES signal to control the position of the transducer 550 via the VCM 518 and actuator arm 555.

The amplitude and relative phase of the 1/(2T) and 1/(3T) components may vary with cross track position, thus the waveshape of the read signal may differ from waveform 414 shown in FIG. 4. Regardless of the waveshape of the read signal, the phase of the constituent orthogonal components provides the timing and position information as described above.

Figure 6:
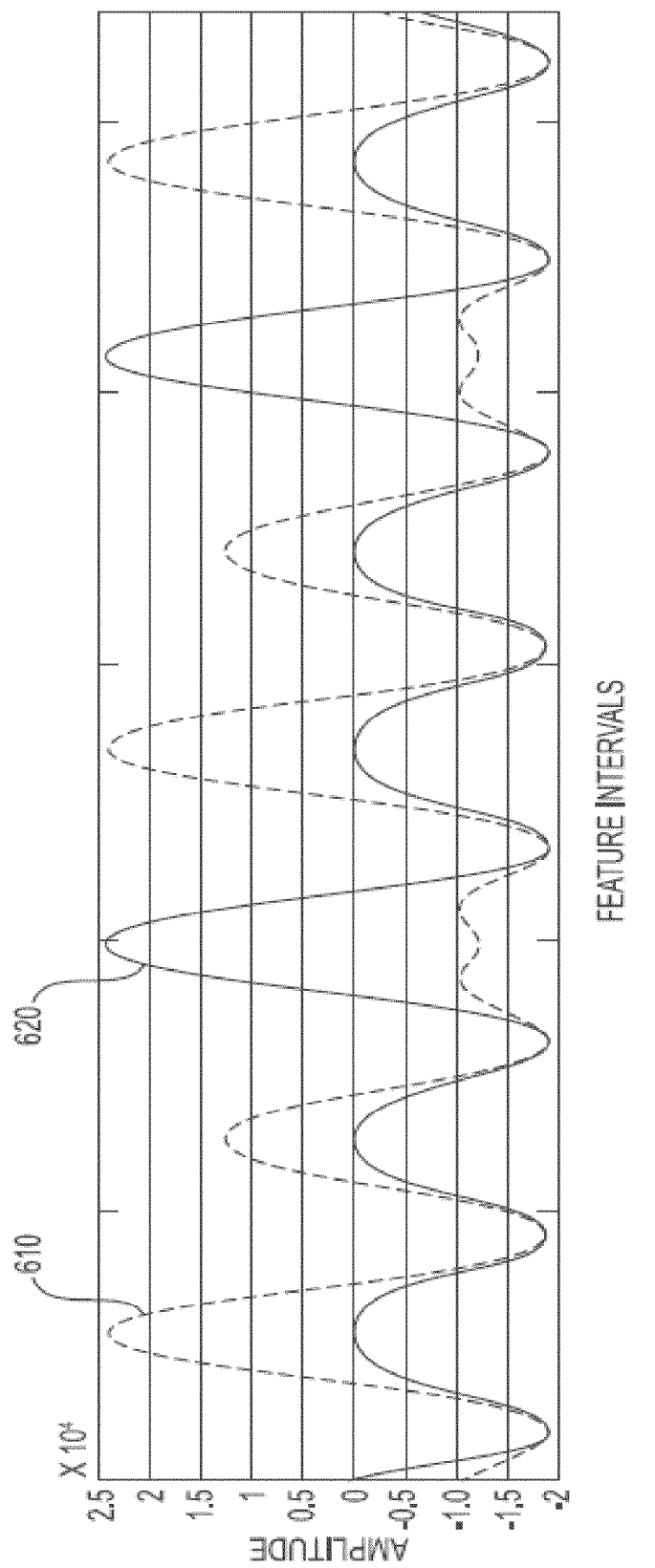
FIG. 6 illustrates two simulated read signals generated by passing a transducer across the pattern of FIG. 2 at two different cross track positions.

FIG. 6 illustrates two simulated read signals 610, 620 generated by passing a transducer across the pattern of FIG. 3 at two different cross-track positions. In this simulation, for a given track position, the signal seen by a transducer at a position was generated and was then convolved with the read transducer's response to simulate a continuous read signal. For a chosen sampling clock phase, the 1/(2T) and 1/(3T) phases were demodulated from the read signal. The demodulated phases were plotted across a sweep of track positions and clock phases.

Figure 7:
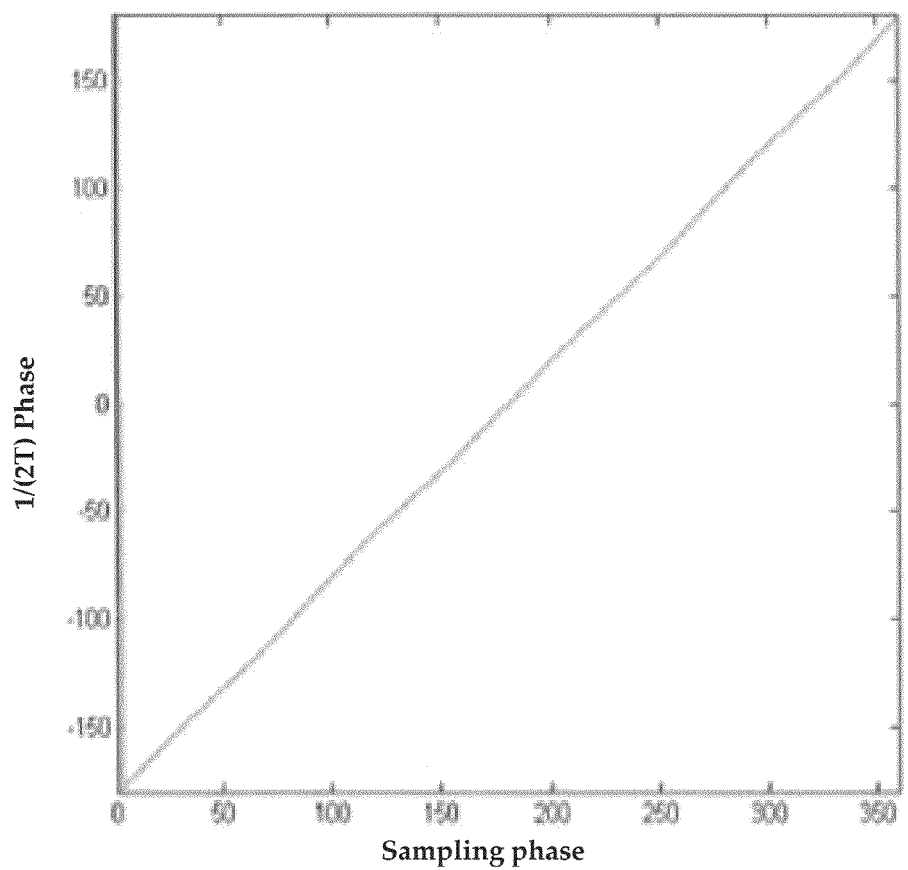
FIG. 7 is a plot of the demodulated 1/(2T) phase for a 360° sweep of simulated phase.

FIG. 7 is a plot of the demodulated 1/(2T) phase (y-axis) for a 360° sweep of the simulated sample phase (x-axis). This graph contains 13 plots for read signals generated at 13 different ¼ track intervals of track positions within a 3-track period of the staggered pattern of FIG. 2. In the plot of FIG. 7, these 13 traces coincide, appearing like a single trace, illustrating that the 1/(2T) phase demodulation is independent of cross-track position, and is only a function of the sampling phase.

Figure 8:
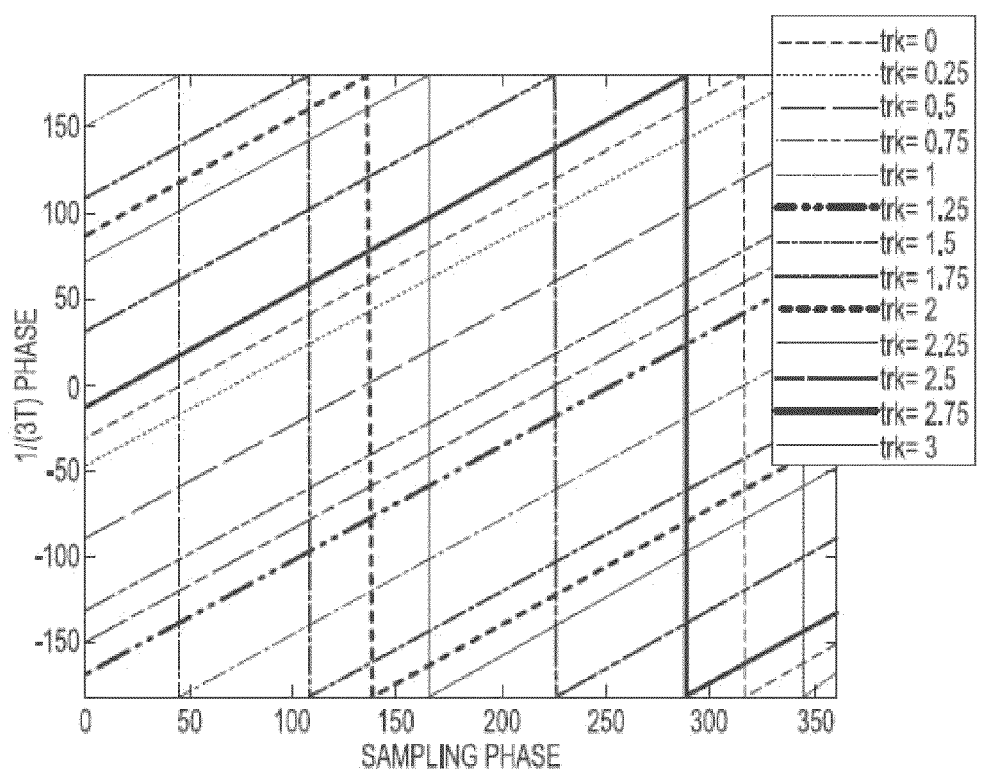
FIG. 8 is a plot of the 1/(3T) phase demodulation over the range of sampling phase for different track positions.

FIG. 8 is a plot of the 1/(3T) phase demodulation (y-axis) over the range of sampling phase for the same 13 track positions shown in the legend. Note that for a given sampling phase, which can be first and/or independently demodulated from the 1/(2T) component, the track position is a function of the 1/(3T) phase. The unequal spacing of the 3T/cycle phase at a given sampling phase implies that some reader-width-dependent linearity correction may be applied to the demodulated phase to generate a cross track position error.

Figure 9:
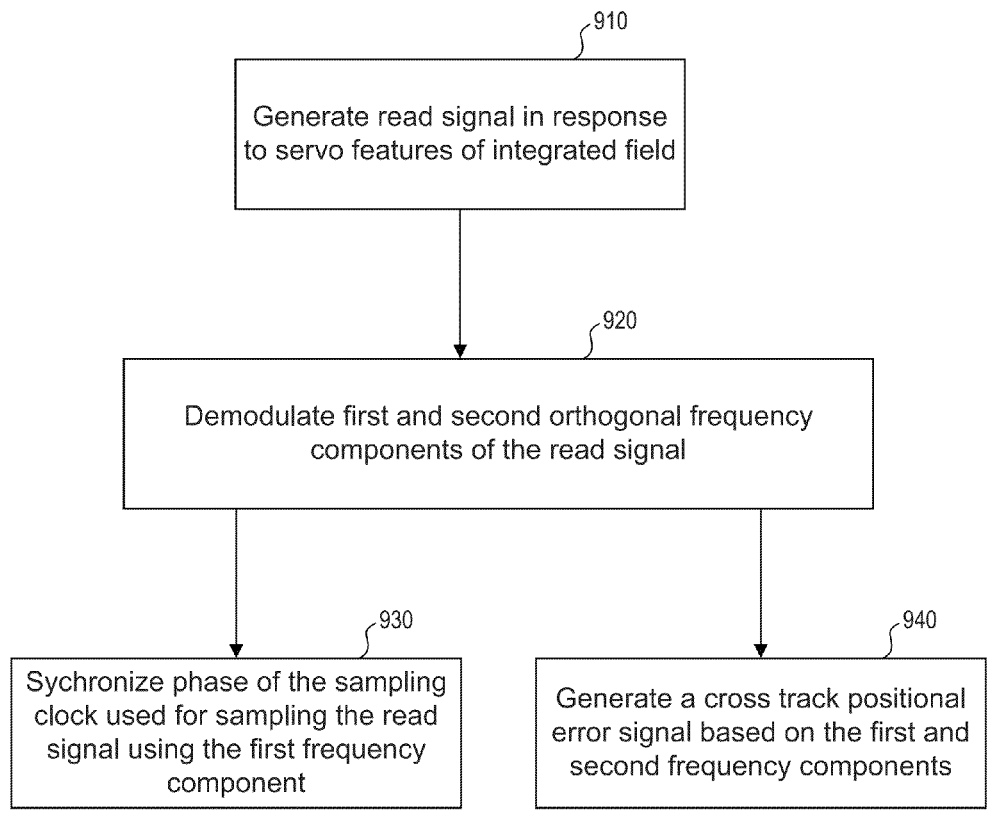
FIG. 9 is a flow diagram illustrating a method of implementing an integrated servo field in accordance with some embodiments.

FIG. 9 is a flow diagram illustrating a method in accordance with some embodiments. A read signal is generated 910 in response to servo features of an integrated servo field as discussed above. First and second orthogonal frequency components, e.g., 1/(2T) and 1/(3T) components, of the read signal are demodulated 920, .e.g., using discrete Fourier transform (DFT). The phase of the sampling clock used to sample the features is synchronized 930 with the phase of the first orthogonal frequency component. A cross track positional error signal is generated 940 using the first and second frequency components, e.g., by normalizing the phase of the second frequency component to the phase of the first frequency component. The same samples can be used to determine both frequency orthogonal components and the synchronization of the phase of the sampling clock and generation of the error signal may occur in either order or at the same time. For example, in various embodiments, synchronization of the phase of the sampling clock and generation of the cross track positional error signal may occur sequentially, concurrently, or simultaneously. In some embodiments, determining the cross track positional error involves applying a transducer width dependent linearity correction to a phase of the second orthogonal frequency component.

The single integrated servo field as discussed herein can simultaneously provide timing acquisition and cross track position information from concurrent demodulation of orthogonal frequency components of the read signal. The sampling phase can be determined from the first orthogonal phase demodulation, e.g., providing the 1/(2T) component, and is independent of cross track position. The offset of the phase of the second orthogonal component, e.g., 1/(3T) component, from the sampling phase is a function of the cross track position and can be used to generate a cross track position error signal. Thus, the phase of the first orthogonal component phase can be used for timing acquisition and as a reference for using the second orthogonal component phase for determining cross track position error. This technique can be realized by servo-writing a pattern such as that shown in FIG. 2 and enables combined functions of timing (preamble) and PES fields on patterned or continuous media.

Figure 10:
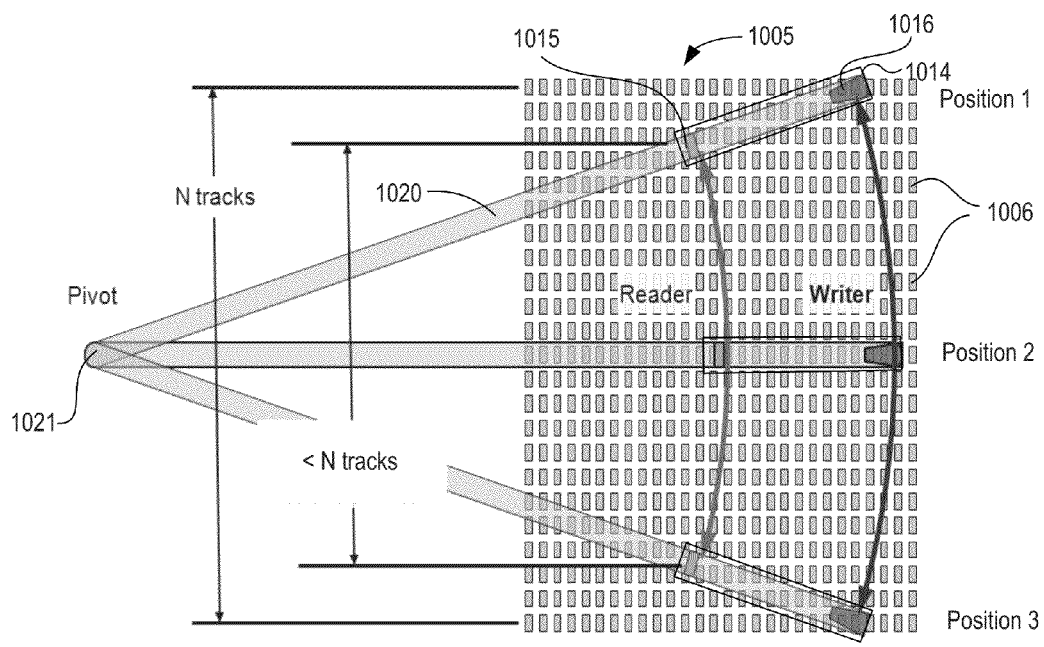
FIG. 10 shows a portion of a storage medium having a pattern of storage features disposed thereon with the actuator arm in three different positions around the pivot.

FIG. 10 shows a portion of a storage medium 1005 having a pattern of storage features 1006 disposed thereon. The features 1006 are shown as having a rectangular shape, but in general the features may have other shapes, e.g., circular, oval, elliptical, etc. and are surrounded by a non-storage region. Data transducers (e.g., read 1015 and write 1016 transducers) are disposed on slider 1014 attached to an actuator arm 1020 and are respectively configured to read data from the storage medium 1005 and to write data to the storage medium 1005. The actuator arm 1020 rotates around a pivot 1021 as the storage medium rotates around a spindle axis. FIG. 10 shows the actuator arm 1020 in three different positions around pivot 1021, indicated as Position 1, Position 2, Position 3. The read transducer 1015 and a write transducer 1016 are spatially separated on the slider 1014, the spatial separation being exaggerated in FIG. 10 for purposes of illustration. When the actuator arm and slider are in position 2, both the read transducer 1015 and write transducer 1016 are centered over a row of the rectangular features 1006. In positions 1 and 3, the write transducer 1016 is centered over a row of the features 1006 and the read transducer 1015 is offset from a row of features 1006 and thus may not accurately read the features 1006.

Embodiments disclosed herein involve approaches for correcting format and/or read/write system impairments. Correction values stored on the medium may be used when reading, writing, or servoing in that region of the media. These media-stored correction values can be applied as anticipatory adjustments to servo positioning, and/or data clock phase and/or frequency, and/or other systematic corrections. An example of these media-stored correction values are repeatable runout (RRO) values used to correct for irregularities of the medium. It will be appreciated that the approaches discussed below are applicable to any type of correction values that are stored on the media and then subsequently used to adjust positional and/or timing parameters to access the medium.

Figure 11:
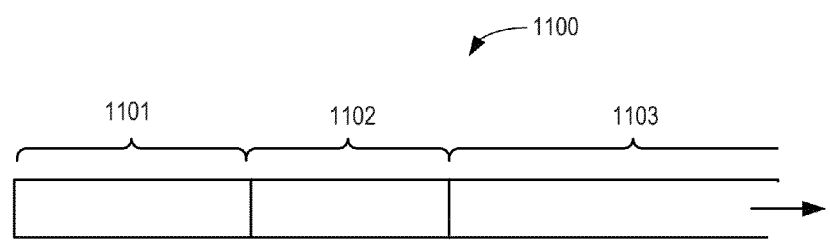
FIG. 11 shows a portion of a track including a servo portion, a data portion, and an repeatable runout (RRO) portion disposed between the servo portion and the data portion.
Figure 12:
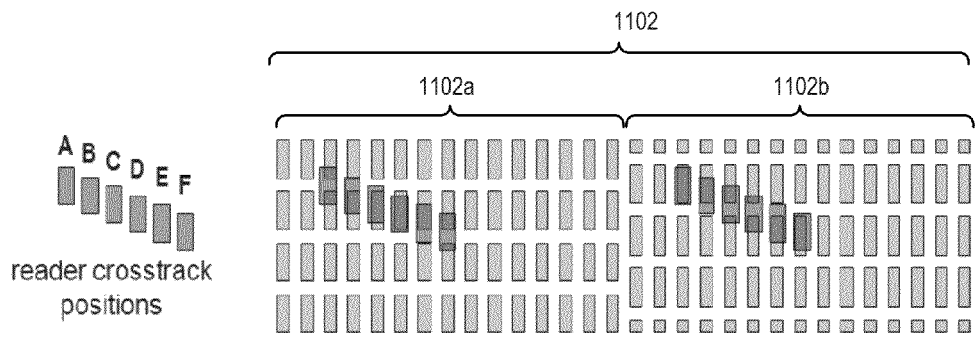
FIG. 12 illustrates a correction portion of a track that includes multiple staggered correction fields.

FIG. 11 shows a portion of a track 1100 including a servo portion 1101, a data portion 1103, and an RRO portion 1102 disposed between the servo portion 1101 and the data portion 1103. The servo portion 1101 may comprise a pattern of first and second features as previously described, for example, in connection with FIG. 2. The data portion 1103 and/or the RRO portion 1102 can include features, e.g., rectangular features, having about the same cross track and down track dimensions as the smaller features of the servo portion 1101. The RRO portion 1102 may include multiple staggered RRO fields, e.g., as illustrated in FIG. 12, the RRO fields storing RRO correction values. The storage medium may include multiple tracks divided into multiple sectors, each sector including an RRO portion comprising multiple staggered correction fields as described herein.

RRO operation involves reading RRO fields with the read transducer at an arbitrary cross-track position. When writing data, the write transducer is centered on a track, but in general, because of skew due to the rotation of the actuator arm and the distance between the read transducer and the write transducer, the read transducer may not be centered on the track. Thus, reading an RRO correction value stored on the medium to be used when writing requires a strategy for storage and reading a field at an arbitrary track position. Although this is straightforward on continuous media, where fields can be recorded at arbitrary track positions, the skew presents a dilemma for patterned media, e.g., BPM, which comprises features fabricated along discrete track positions.

Embodiments discussed herein may involve a patterned storage medium having multiple tracks in a radial span of tracks, e.g., a sector, of a storage medium, wherein one or more tracks in the span include multiple correction fields, e.g., multiple RRO fields. The multiple correction fields of the one or more tracks include at least a first correction field storing a correction value and a second correction field redundantly storing the correction value. Each second correction field is offset along a cross track direction with respect to a first correction field that redundantly stores the same correction value as the second correction field. In some embodiments, one or more tracks in the radial span of tracks include a single non-redundant correction field that stores the correction value for the track. In a radial span of tracks, tracks having a single non-redundant correction field may be interspersed among tracks having multiple staggered correction fields that redundantly store the correction value for the track.

For example, FIG. 12 illustrates a correction portion 1102 comprising rectangular features, the correction portion 1102 having a first correction field 1102a and a second correction field 1102b. Each rectangular feature may be one magnetic domain. The second correction field 1102b is offset along the cross track direction from the first correction field 1102a by ½ the width of the data portion of the track this example. In general, the multiple correction fields may include any number of correction fields that are offset from one another by any fraction of the width of the data portion of the track. As discussed above, in a radial span of tracks, tracks having a single correction field may be interspersed among the tracks having multiple offset correction fields. After correction values are calibrated in manufacturing, the correction values are non-redundantly stored in the tracks that have a single correction field and are redundantly stored in the staggered fields 1102a, 1102b. Each correction value may be appended with an error detection or error detection and correction code (ECC).

Figure 13:
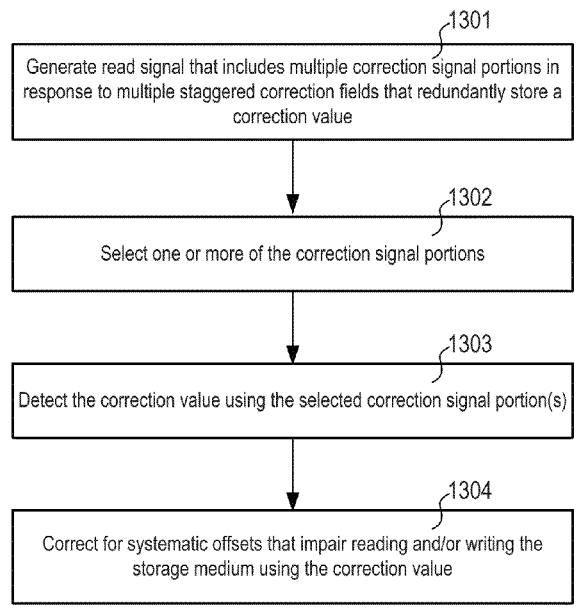
FIG. 13 is a flow diagram illustrating a method of correcting for systemic offsets that impair reading and/or writing the medium using multiple staggered correction fields.

FIG. 13 is a flow diagram illustrating a method of correcting for systemic offsets that impair reading and/or writing the medium using multiple staggered correction fields. When a slider is positioned relative to the storage medium for writing during normal drive operation, a read signal is generated in response to the read transducer traversing a correction portion of a track of a patterned storage medium. The read signal includes at least a first correction signal portion responsive to a first correction field that stores a correction value and a second correction signal portion responsive to a second correction field that redundantly stores the correction value. The first signal portion is temporally offset from the second signal portion. One or more of the correction signal portions are selected 1302 and the correction value is detected 1303 using the selected correction signal portion or portions. The error due to systemic offsets, e.g., cross track positional error of the data transducer relative to the patterned storage medium, is corrected 1304 using the correction value.

Returning to FIG. 12, the light gray rectangles on the left of FIG. 12 illustrate the read transducer footprint at six different cross track positions A through F. FIG. 12 shows the corresponding overlap of the reader at each position of the storage medium in the first 1102*a* and second 1102*b* correction fields. Positions C and D (third and fourth rectangles in each set of six reader footprint positions), would favor detection from the first correction field 1102*a*, since the reader is nearly centered over a row in the first RRO field 1102*a*, and is between rows in the second correction field 1102*b*. Similarly, positions A and F would favor detection from the second correction field 1102*b*.

At positions B and E, the read transducer is not substantially centered over a row of either field, although these positions feature overlap with a dominant row in each field. Recovery of the correction values at these positions could rely on joint detection and/or multiple input single output (MISO) techniques including, for example, techniques that average or otherwise combine the read signals from the first and second fields 1102*a*, 1102*b* to obtain the correction values.

As appreciated from the mechanical geometry of the actuator arm 1020 and slider 1014 shown in FIG. 10, the read transducer 1015 may be closer to the pivot 1021 than the write transducer 1016. Thus, when the write transducer 1016 traverses a radial span of N discrete tracks, the read transducer 1015 traverses fewer than N tracks. In turn, this means that the N correction values required for writes in that radial span must be stored in a radial span of fewer than N discrete tracks. In FIG. 10, the actuator arm 1020 is shown in 3 positions over which the write transducer 1016 covers N tracks. Because of the shorter pivot-to-reader radius, the number of tracks spanned by the read transducer 1015 over this same angular span is fewer than the number spanned by the writer 1016.

This mismatch of storing N correction values in a radial span less than N tracks wide can be accommodated by identifying points along the stroke via calibration where only a single one of the two staggered correction fields are required. At such points, the reader-to-writer cross track offset due to skew corresponds to some integer multiple of the fraction of the track pitch of the stagger, e.g., ½-track pitch, and the reader will be nearly centered over a known one of the staggered correction fields, leaving the other staggered correction field available for an adjacent value rather than using the other correction field to duplicate the storage of the correction value. This periodic allocation of a correction value to only one of the staggered fields allows N correction values to be stored in a radial span of fewer than N tracks.

Figure 14:
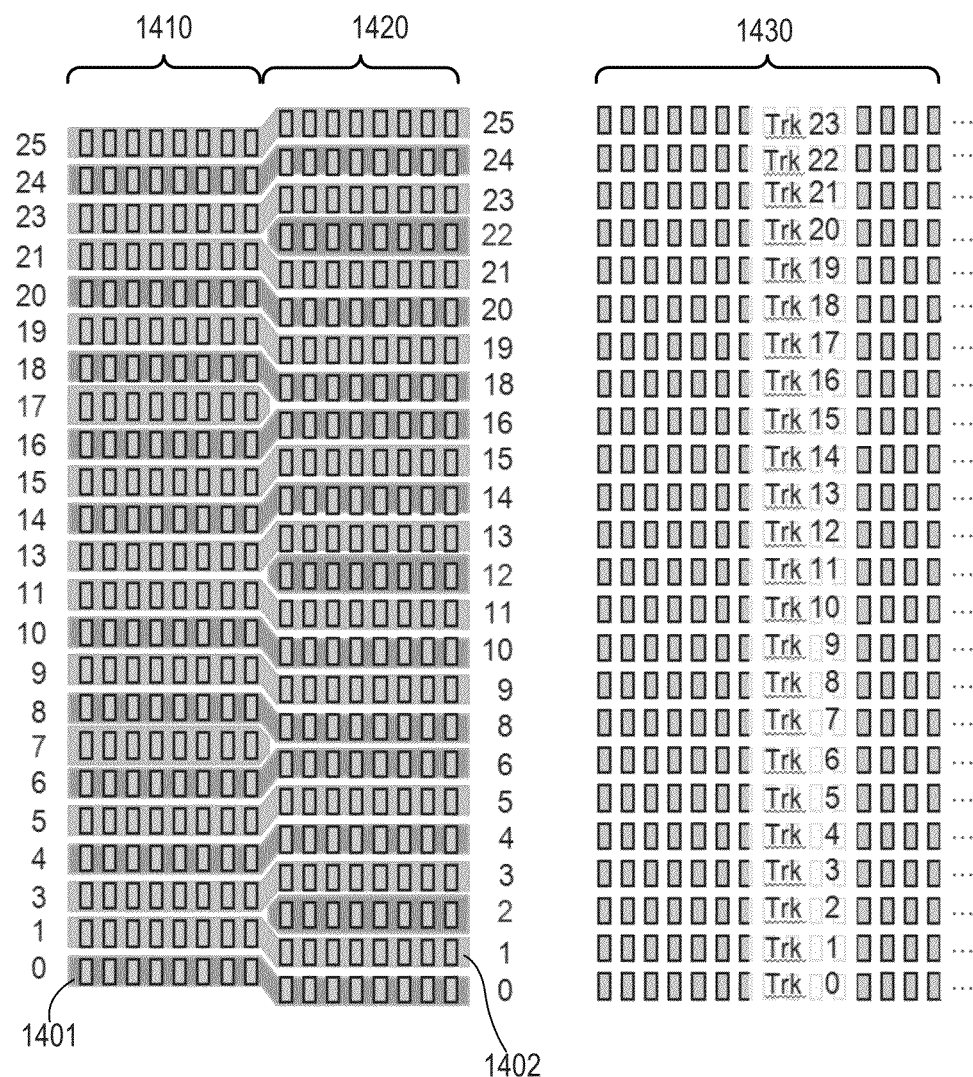
FIG. 14 illustrates approach for storing N correction values in fewer than N tracks.

An approach for storing N correction values in fewer than N tracks is illustrated in FIG. 14, where 26 correction values (0 through 25) are stored in a span of only 24 tracks. In FIG. 14, the alternating lighter shaded 1402 and darker shaded regions 1401 bound the correction fields 1410, 1420 where a correction value is written, usually duplicated in the first and second correction fields 1410, 1420. Occasionally, correction values are stored non-redundantly in a single one of the fields, e.g., correction fields 2, 7, 12, 17, 22, as shown in FIG. 14. As illustrated in FIG. 14, correction values for N tracks are stored in less than N tracks, wherein a first subset of the N tracks (tracks 0-6, 8-11, 13-16, 18-21, and 23-25 in FIG. 14) includes the first and second correction fields and a second subset of the N tracks (tracks 2, 7, 12, 17, 22 in FIG. 14) includes one non-redundant correction field. The tracks of the second subset are interspersed among the tracks of the first subset.

Figure 15:
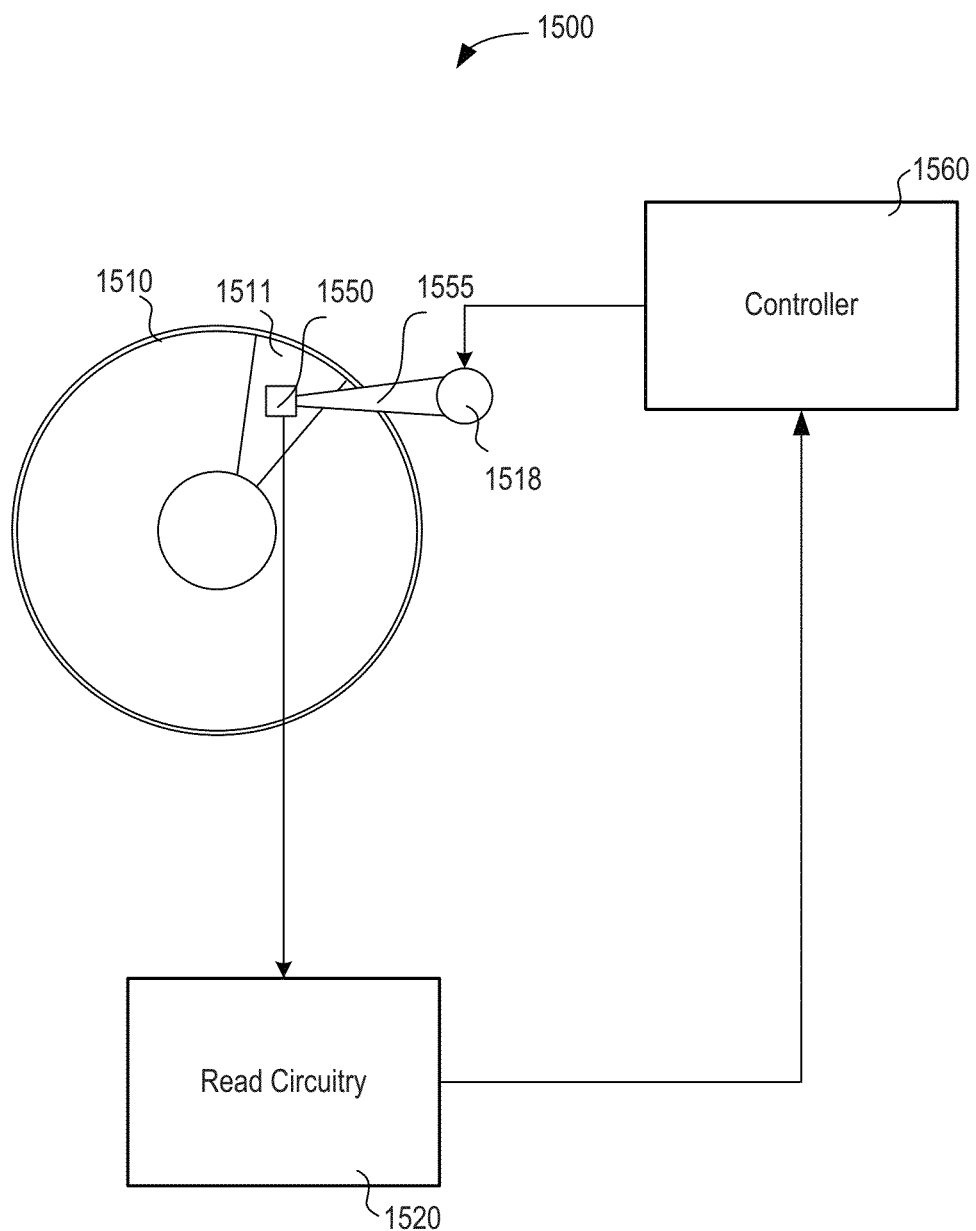
FIG. 15 is a block diagram illustrating a system for implementing multiple staggered correction fields in accordance with some embodiments.

FIG. 15 is a block diagram illustrating a system 1500 in accordance with some embodiments. The system 1500 includes a data transducer 1550 attached to an actuator arm 1555, the data transducer 1550 arranged to sense storage features of a patterned storage medium 1510. The patterned storage medium 1510 may include tracks arranged circumferentially on the storage medium. One or more tracks in a radial span of tracks can include multiple correction fields that are staggered in the cross track direction and redundantly store an RRO value. Tracks having a single correction field may be interspersed among the tracks that have multiple staggered corrections fields.

Read circuitry 1520 communicatively coupled to the data transducer 1550 generates a read signal in response to the data transducer 1550 sensing a correction field or multiple correction fields of a track of the patterned storage medium 1510. For tracks with multiple staggered correction fields, the read signal includes multiple correction signal portions that are temporally offset from each other. Each correction signal portion corresponds respectively to one of the multiple correction fields of a track. For example, the read signal may include at least a first correction signal portion responsive to a first correction field that stores the correction value and a second correction signal portion responsive to a second correction field that redundantly stores the correction value. The first correction field is offset from the second correction field on the storage medium in a cross track direction.

Controller 1560 is configured to select one or both of the first correction signal portion and the second correction signal portion and to use the correction value of the selected signal portion or portions to correct systematic offsets, e.g., timing and/or positional offsets, that impair reading and/or writing the medium. For example, the controller 1560 may control the VCM 1518 to move the actuator arm 1555 to correct for cross track positional offset.

According to some implementations, the controller 1560 may determine if the one of the correction signal portions is stronger than another of the correction signal portions and select the stronger of the correction signal portions. According to some implementations, detection of the correction value of the one or more correction signal portions may involve decoding the correction value and using an error detection and/or error detection code stored with the correction value. For example, if the correction value of the first correction signal portion can be decoded without errors, the controller 1560 may select the first correction signal portion.

According to some implementations, the controller 1560 is configured to select multiple correction signal portions, e.g., both the first correction signal portion and the second correction signal portion if the strengths of the correction signal portions are below a threshold value and/or if errors are detected in the correction value of the correction signal portions. If multiple correction signal portions are selected, the controller 1560 can be configured to jointly detect the correction value using the multiple correction signal portions. If multiple correction signal portions are selected, the controller 1560 can be configured to combine the selected correction signal portions to provide a combined signal and to detect the correction value using the combined signal.

The techniques and structures described herein may be used in a magnetic memory device, a hybrid drive that incorporates multiple types of media, e.g., both magnetic media and solid state media, and/or an optical memory device, for example. The embodiments discussed herein are illustrated using magnetic disk media, however, it will be appreciated that the approaches are also applicable to other types of media, such as optical or magneto-optical media.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

It should also be understood by persons having ordinary skill in the art that the terminology used herein is for the purpose of describing some particular embodiments, and the terminology does not limit the concepts provided herein. Unless indicated otherwise, ordinal numbers (e.g., first, second, third, etc.) are used to distinguish or identify different elements or steps in a group of elements or steps, and do not supply a serial or numerical limitation. For example, "first," "second," and "third" elements or steps need not necessarily appear in that order, and embodiments need not be necessarily limited to the three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A device comprising:
a transducer configured to sense a pattern of features of a storage medium and to generate a transducer signal, the pattern of features including first features having a first logical state and second features having a second logical state, a cross track dimension of the first features being different from a cross track dimension of the second features;
read circuitry configured to sample the transducer signal at a frequency of a sampling clock signal and to generate a read signal from the sampled transducer signal;
servo electronics comprising:
a demodulator configured to demodulate at least first and second orthogonal frequency components of the read signal;
timing circuitry configured to synchronize a phase of the sampling clock signal with a phase of the pattern of features using the first orthogonal frequency component; and
position error circuitry configured to generate a signal indicating a cross track positional error of the transducer relative to the features using the first and second orthogonal frequency components.

2. The device of claim 1, wherein:
the first and second features are magnetic features;
the first logical state comprises a first magnetization orientation and the second logical state comprises a second magnetization orientation; and
each magnetic feature is a single magnetic domain.

3. The device of claim 1, wherein the cross track dimension of the second features is about twice the cross track dimension of the first features.

4. The device of claim 1, wherein a down track dimension of the first features and a down track dimension of the second features are about equal.

5. The device of claim 1, wherein:
the first orthogonal frequency is 1/(2T); and
the second orthogonal frequency is 1/(3T), where T is a period of a single feature.

6. The device of claim 1, wherein the demodulator is configured to perform discrete Fourier transform demodulation to demodulate the first and second orthogonal frequency components of the read signal.

7. The device of claim 1, wherein the demodulator is configured to concurrently demodulate the first and second orthogonal frequencies.

8. A system comprising:
a pattern of magnetic features disposed along a servo track of a storage medium, the pattern including first features corresponding to a first logical state and second features corresponding to a second logical state, a cross track dimension of the first features being different from a cross track dimension of the second features;
a transducer configured to sense the magnetic features and to generate a transducer signal in response to the pattern of magnetic features;
read circuitry configured to sample the transducer signal at a frequency of a sampling clock signal and to generate a read signal from the sampled transducer signal;
a sampling clock configured to generate the sampling clock signal;
servo circuitry, comprising:
a demodulator configured to demodulate at least first and second orthogonal frequency components of the read signal;
timing circuitry configured to synchronize a phase of the sampling clock signal with a phase of the pattern of features using the first orthogonal frequency component; and
position circuitry configured to determine a cross track positional error of the transducer using the first and second orthogonal frequency components.

9. The system of claim 8, wherein the first and second features are magnetic features and the first logical state comprises a first magnetization orientation and the second logical state comprises a second magnetization orientation and each magnetic feature is a single magnetic domain.

10. The system of claim 8, wherein each of the features is a single magnetic domain.

11. The system of claim 8, wherein the pattern of features comprises a repeating pattern of second feature, first feature, second feature, first feature, first feature, first feature.

12. The system of claim 8, wherein the cross track dimension of the second features is about twice the cross track dimension of the first features.

13. The system of claim 8, wherein a down track dimension of the first features and a down track dimension of the second features are about equal to each other and to a down track dimension of data features of the storage medium.

14. The system of claim 8, wherein the storage medium comprises a continuous magnetic medium.

15. The system of claim 8, wherein the storage medium comprises a patterned medium.

16. The system of claim 8, wherein:
the first orthogonal frequency component is 1/(2T); and
the second orthogonal frequency component is 1/(3T), where T is period of the a single feature a down track direction.

17. A method comprising:
generating a read signal in response to sensing a pattern of features disposed along a servo track of a storage medium, the pattern including first features corresponding to a first logical state and second features corresponding to a second logical state, a cross track dimension of the first features being different from a cross track dimension of the second features;
demodulating at least first and second orthogonal frequency components of the read signal; and
synchronizing a phase of a sampling clock signal used in generating the read signal with a phase of the pattern of features using a phase of the first orthogonal frequency component; and
determining a cross track positional error based on phases of the first and second orthogonal frequency components.

18. The method of claim 17, wherein:
demodulating the first orthogonal frequency component comprises demodulating a 1/(2T) frequency component; and
demodulating the second orthogonal frequency component comprises demodulating a 1/(3T) frequency, where T is a period of a single feature along a down track direction.

19. The method of claim 17, wherein demodulating the first and second frequency components comprises concurrently demodulating the first and second frequency components using a discrete Fourier transform.

* * * * *